United States Patent
Bohannon et al.

(10) Patent No.: US 11,934,437 B2
(45) Date of Patent: Mar. 19, 2024

(54) STANCE DETECTION AND SUMMARIZATION FOR DATA SOURCES

(71) Applicant: Primer Technologies, Inc., San Francisco, CA (US)

(72) Inventors: John Bohannon, San Francisco, CA (US); Leonard Apeltsin, Berkeley, CA (US); Raine Morgan Hoover, San Francisco, CA (US); Wei Gong, San Francisco, CA (US)

(73) Assignee: Primer Technologies, Inc., San Francisco, CA (US)

( * ) Notice: Subject to any disclaimer, the term of this patent is extended or adjusted under 35 U.S.C. 154(b) by 0 days.

(21) Appl. No.: 16/422,554

(22) Filed: May 24, 2019

(65) Prior Publication Data

US 2020/0004770 A1 Jan. 2, 2020

Related U.S. Application Data

(60) Provisional application No. 62/693,294, filed on Jul. 2, 2018.

(51) Int. Cl.
*G06F 16/34* (2019.01)
*G06F 3/0482* (2013.01)
*G06F 9/54* (2006.01)
*G06F 16/31* (2019.01)
*G06F 16/953* (2019.01)

(52) U.S. Cl.
CPC .......... *G06F 16/345* (2019.01); *G06F 3/0482* (2013.01); *G06F 9/542* (2013.01); *G06F 16/313* (2019.01); *G06F 16/328* (2019.01); *G06F 16/953* (2019.01)

(58) Field of Classification Search
CPC .... G06F 16/345; G06F 16/953; G06F 16/313; G06F 16/328; G06F 9/542
See application file for complete search history.

(56) References Cited

U.S. PATENT DOCUMENTS

| | | | |
|---|---|---|---|
| 2006/0004866 A1* | 1/2006 | Lawrence | G06F 16/24578 |
| 2009/0112892 A1* | 4/2009 | Cardie | G06F 16/93 |
| 2009/0193328 A1* | 7/2009 | Reis | G06N 5/025 |
| | | | 715/231 |
| 2014/0279731 A1* | 9/2014 | Yakovenko | G06N 20/00 |
| | | | 706/12 |
| 2014/0304264 A1* | 10/2014 | Hailpern | G06F 16/35 |
| | | | 707/737 |
| 2015/0261773 A1* | 9/2015 | Walid | G06F 16/951 |
| | | | 707/769 |
| 2017/0011092 A1* | 1/2017 | Huddleston | G06F 16/2455 |
| 2018/0285461 A1* | 10/2018 | Smith | G06F 16/954 |
| 2019/0339835 A1* | 11/2019 | Sultan | G06F 16/9538 |

* cited by examiner

*Primary Examiner* — Hope C Sheffield

(57) ABSTRACT

Systems, methods, and software described herein provide improvements of identifying stances of data sources for events. In one implementation, an event summary service identifies data objects that correspond to an event and identifies a data source from a plurality of data sources for each of the data objects. The summary service further, for each data object of the data objects, processing the data object to identify pertinent data related to a stance for the data source for the data object in relation to the event, and identifies a stance for each of the plurality of data sources based on the pertinent data identified in the data objects.

12 Claims, 7 Drawing Sheets

| DATA SOURCES 510 | FIRST STANCE TYPE 512 | SECOND STANCE TYPE 513 | THIRD STANCE TYPE 514 |
|---|---|---|---|
| DATA SOURCE 520 | 25% | 50% | 25% |
| DATA SOURCE 521 | 50% | 28% | 32% |
| DATA SOURCE 522 | 60% | 20% | 20% |
| DATA SOURCE 523 | 15% | 60% | 25% |

DATA STRUCTURE 500

STANCE DETECTION AND SUMMARIZATION FOR DATA SOURCES

RELATED APPLICATIONS

This application hereby claims the benefit of and priority to U.S. Provisional Patent Application No. 62/693,294, titled "STANCE DETECTION AND SUMMARIZATION FOR DATA SOURCES," filed Jul. 2, 2018, and which is hereby incorporated by reference in its entirety.

BACKGROUND

News sources often generate images, articles, graphs, and other similar objects that are used in providing information about a particular event. These events may include financial events, world news events, local news events, among other possible events. The objects generated may include various facts, relevant images, or other similar data that can be used in providing a reader or viewer with information about the particular event. However, although news stories may provide information about a particular event, different news stories may provide different information, and may even provide false information. As a result, readers and viewers of the objects may find it difficult to identify important information within the objects, as well determine the information that is factually correct.

OVERVIEW

Provided herein are enhancements for managing summarization and stance detection for data sources. In at least one implementation, an event summary service identifies data objects that correspond to an event and identifies a data source from a plurality of data sources for each of the data objects. The event summary service further, for each data object of the data objects, processes the data object to identify pertinent data related to a stance for the data source for the data object in relation to the event. Once processed, the event summary service also identifies a stance for each of the plurality of data sources based on the pertinent data identified in the data objects and generates a summary based on the stances of the plurality of sources.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 5 illustrates a data structure for maintaining stance information for data objects according to an implementation.

DETAILED DESCRIPTION

Figure 1:
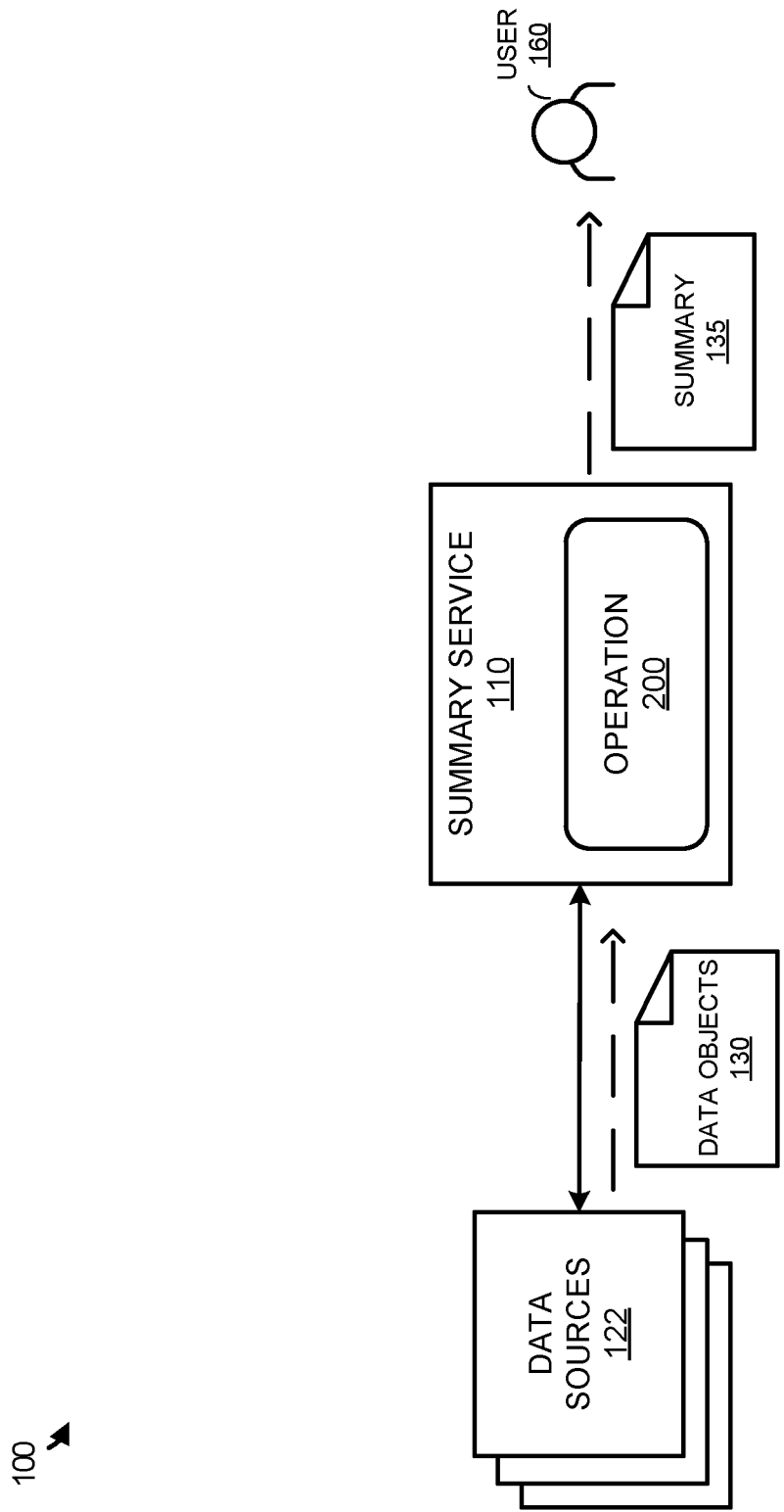
FIG. 1 illustrates a computing environment to manage event summaries from multiple data sources according to an implementation.

FIG. 1 illustrates a computing environment 100 for multi-source event summarization according to an implementation. Computing environment 100 includes data sources 122, summary service 110, and user 160. Summary service 110 communicates with data sources 122 via various communication links and implements event operation 200 using objects received from sources 122.

In operation, data sources 122 generate data objects 130, such as text news stories, documents, social media posts, images, graphs, and other similar objects to provide information about various topics. For example, a data source in data sources 122 may generate a news article for a death of a diplomatic leader. As the objects are generated, the objects are obtained by summary service 110, wherein the objects may be processed to identify events associated with the data objects, wherein the events may comprise product release dates, terrorist attacks, financial events (such as an initial public offering), a life of a person of interest, an event for an organization (such as a product recall), or some other similar event. In some implementations, the events may be identified by an administrator or user of summary service 110, such that objects are classified into the events of interest. In other implementations, the data objects themselves may be used to identify an event, wherein the classification of an event may be based on the data content of the objects, the quantity of data objects that contain the same or similar content, the time period in which the data objects are identified, or some other similar relevant factor. Once the events and the corresponding data objects are identified, summary service 110 may generate summaries, such as summary 135, that are provided to user 160.

In at least one implementation, summary service 110 may be capable of identifying various types of summaries, these summaries may include text-based summaries that provide relevant data from the event, image-based summary that can provide graphical information from the various data sources for an event or events, comparison summaries that can compare data between different sources, or some other similar summary. In the present implementation, at least one type of summary that is available to user 160 comprises a stance detection summary, wherein stance detection may provide a stance for a singular event or for a particular data source of data sources 122. As further described herein, a stance may comprise a political stance, an economic stance, or some other similar type of stance.

Figure 2:
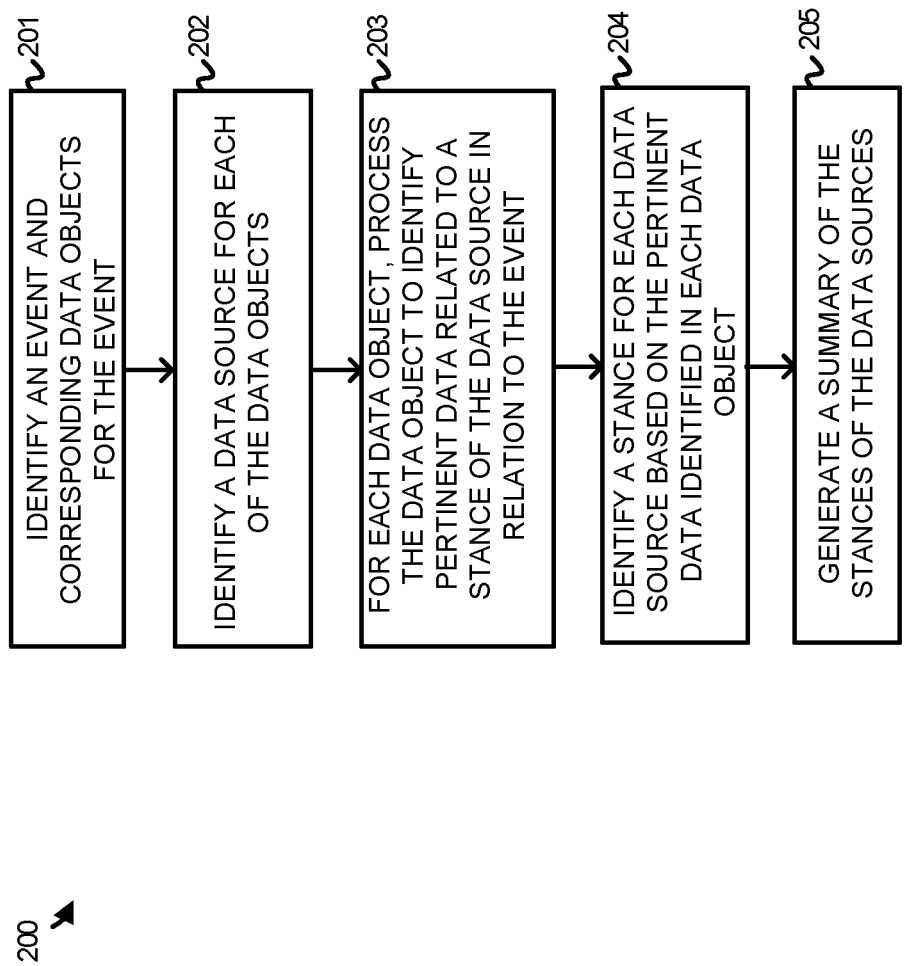
FIG. 2 illustrates an operation of a summary service to provide stance detection for events according to an implementation.

To further demonstrate the operations of summary service 110, FIG. 2 is provided. FIG. 2 illustrates an operation 200 of a summary service to provide stance detection for events according to an implementation. Operation 200 is described parenthetically in the paragraphs that follow with reference to systems and elements of computing environment 100 of FIG. 1.

As described herein, as data sources 122 generate objects 130, the objects are identified by summary service 110 where they are classified as corresponding to various events. Once the events and data objects are identified, operation 200 identifies (201) an event of interest and corresponding data objects for the event. In some implementations, the event of interest may be provided by user 160, wherein user 160 may provide user input indicating an event of interest and/or the type of summary that they prefer. In response to the request, summary service 110 may identify all relevant data objects that correspond to the particular event. In some examples, each of the data objects may be stored with metadata indicating the one or more events to which they correspond. As a result, when a summary is required, summary service 110 may identify all data objects with metadata corresponding to the particular event.

Once the data objects for an event are identified, summary service 110 identifies (202) a data source for each of the data objects, wherein the data source may comprise a domain name, a news outlet affiliation, a company name, or some other similar affiliation. For example, all data objects obtained from domain ABC.com may be classified as a separate source than XYZ.org. Summary service 110 further, for each data object of the identified data objects, processes (203) the data object to identify pertinent data related to a stance of the data source in relation to the event. In processing the data object, summary service 110 may identify content related to the stance of the source, organization of the content that may correspond to the stance of the source, word choice for the data object in relation to a stance of the source, or some other similar information related to stance of the source. In some implementation, summary service 110 may maintain at least one data structure with information that can be used in identifying stance information within a data object. The at least one data structure may comprise a table, linked list, array, or some other similar data structure, including combinations thereof capable of storing information that can be identified within data objects that relate to the stance of the data object. The information may include words or phrases of interest, organization information for how content is arranged in the data object, authorship information, or some other similar information about how to classify a data source to a particular stance. For example, summary service 110 may maintain information that indicates whether particular word choice within the context of a data object should classify that data object (and data source) as more conservative or more liberal. Similar operations may also be performed to identify an economic stance for the data object and/or source (e.g. positive market stance, negative market stance, and like), or may use similar operations to identify any other similar stance related data from a data object.

Once the pertinent stance data is identified from the data object, summary service 110 identifies (204) a stance for each data source based on the pertinent stance data identified in the data objects for the event and generates (205) a summary based on the stances for the data sources. In some implementations, to identify a stance for each of the data sources, summary service 110 may generate a stance score, wherein the score is generated based on the pertinent stance data identified for that source.

As an example, if the stance of interest identified whether the data source was of conservative or liberal ideology, summary service 110 may score the relevant or pertinent data to determine whether the data source was more conservative or liberal. Once a stance is determined, summary service 110 may generate a summary based on the stance data. This summary may indicate a stance for each of the data sources, a stance for a single data source, the stances of the data sources in relation to one another, or some other similar information related to the stance of the data sources. The summary may be generated as text, may be generated as a graph or table, or may be generated in any other similar manner. Once generated, summary service 110 may display the summary locally via a local display or other similar user interface, or may provide the summary to an external system to display the summary 135 to user 160.

Figure 3:
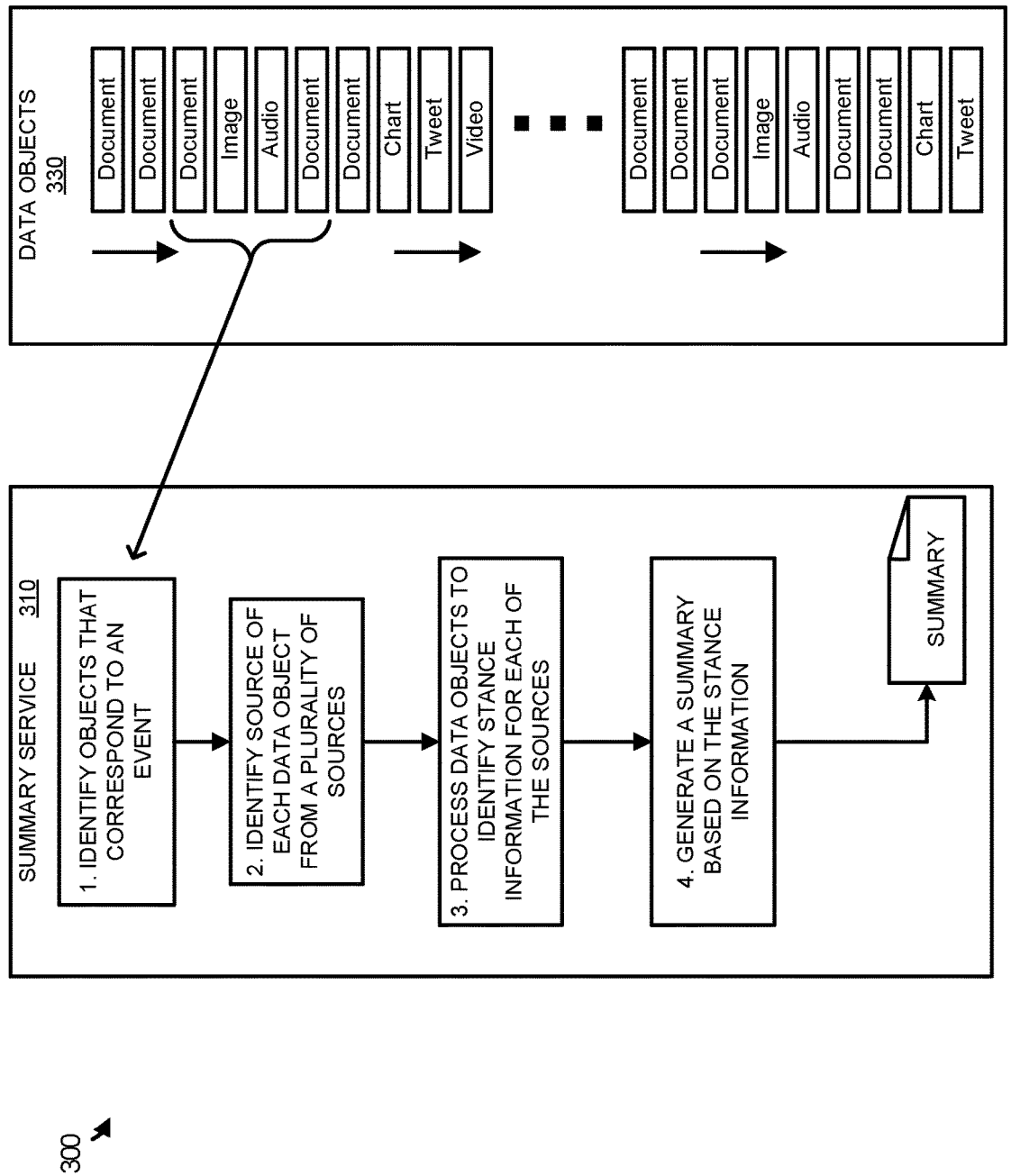
FIG. 3 illustrates an operational scenario of providing enhanced stance detection for data sources according to an implementation.

FIG. 3 illustrates an operational scenario 300 of providing enhanced stance detection for data sources according to an implementation. Operational scenario 300 includes summary service 310 and data objects 330, which are provided via data sources, such as websites, databases, and other similar repositories.

As depicted, summary service 310 identifies, at step 1, objects that correspond to an event. In some implementations, the identification operation may occur in response to a user request for a summary of an event. For example, a user may request a summary indicating a political stance for one or more data sources with respect to a particular event, such as a new treaty, election, or some other similar political event. Once the objects are identified, in some examples using data that is stored in association with the data objects, summary service 310 identifies a source of each data object from a plurality of sources for the particular event, at step 2. Additionally, summary service 310 processes, at step 3, the identified data objects to identify pertinent stance information to the relevant stance at issue. This stance information may be identified from the author of the data object, terms or phrases within the data object, the order of which data is presented in the article, references to other data objects or authors, or some other similar information. In at least one implementation, summary service 310 may compare the information stored in one or more data structures to the data objects to identify pertinent information in the data object.

In at least one implementation, a user of summary service 310 may specify the type of stance information that is relevant. For example, summary service 310 can identify a political stance, economic stance, or other types of stances for a particular event. As a result, when the user requests a summary for the event, the user may identify the relevant stance type that is desired.

Once the pertinent stance information is identified, summary service 310 may generate a summary based on the stance information, at step 4. This summary may be text based and/or include one or more graphs or images to demonstrate the stance of the data sources. The summary may indicate the stance of a single data source (e.g. the source most affiliated with a particular stance, such as the most conservative or liberal data source), may indicate the stance of multiple data sources, may indicate the difference in stance between data sources, or may indicate any other similar information related to the stance of the data sources.

Figure 4:
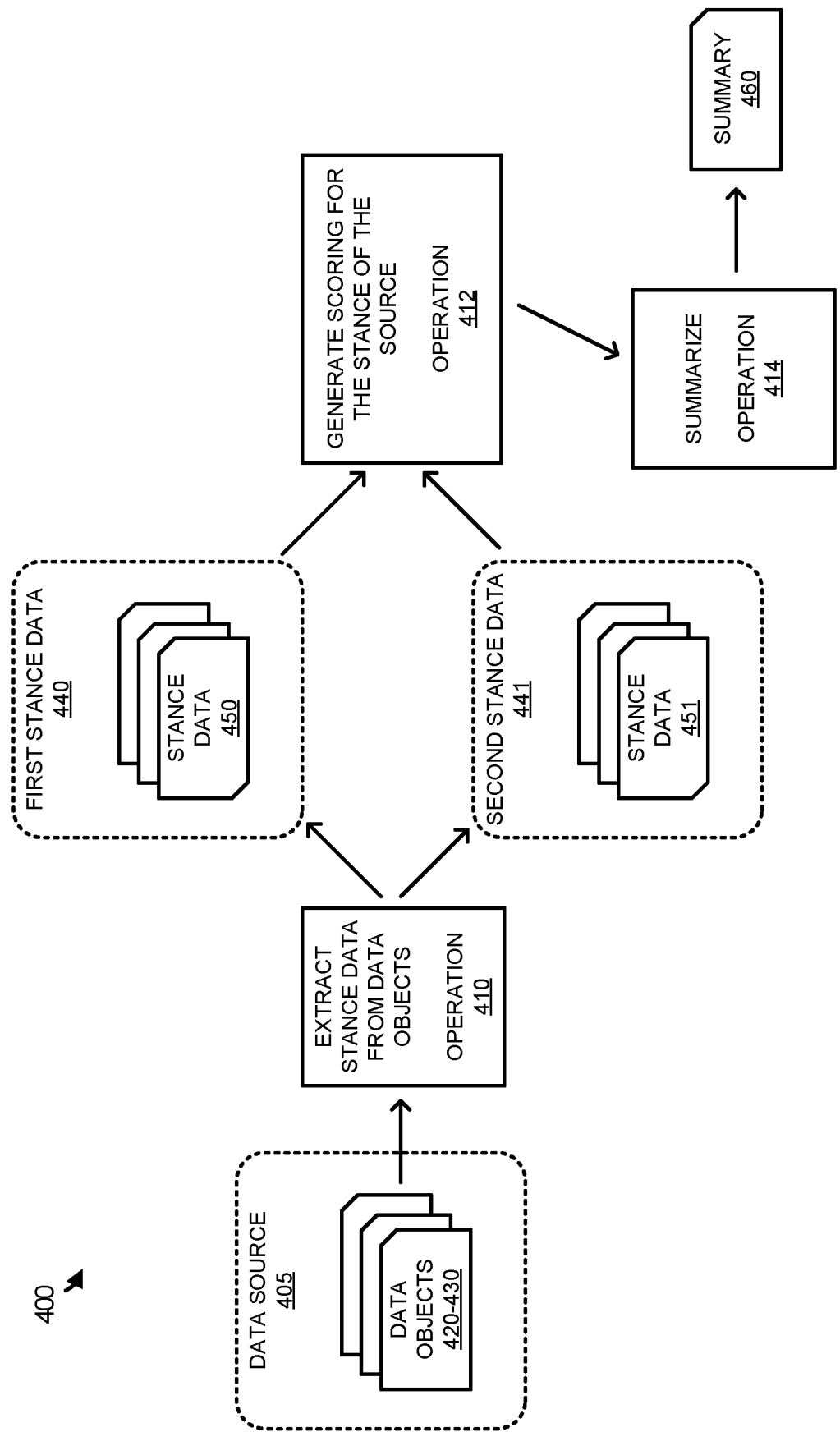
FIG. 4 illustrates an operation of providing stance detection for a data source according to an implementation.

FIG. 4 illustrates an operation 400 of providing stance detection for a data source according to an implementation. Operation 400 includes data source 405, operation 410, stance data 440-441, operation 412, operation 414, and summary 460. Operations 410, 412, and 414 may be provided by summary service 110 of FIG. 1 or summary service 310 of FIG. 3.

In operation, data source 405 generates data objects 420-430 that are identified by a summary service that can provide summaries of events to various end users of the service. Here, once the objects are obtained for a particular data source, operation 410 may be performed to extract stance data from the data objects related to a particular stance type of interest. As an example, the summary service may process data objects from a news agency to identify data related to the political stance of the data source. In the present implementation, operation 410 identifies relevant stance data 440-441 that corresponds to first stance data 410 and second stance data 411. While demonstrated in the example of FIG. 4 with two stances (first stance data 440 and second stance data 441), it should be understood that a stance of interest could have additional stances. Referring to political example provided above, although examples may identify data indicating whether the data source is conservative or liberal, it should be understood that these political opinions may be provided in finer granularity.

Once the stance data is extracted from the data objects corresponding to data source 405, operation 412 is performed to generate scoring for the stance of the source. Operation 412 may generate scoring based on the quantity of data items that qualify for each of stance data 440 or 441, the types of data that were identified that qualified for each of stance data 440 or 441, or some other similar type of scoring mechanism. In some implementations, operation 412 may generate the scoring using one or more algorithms capable of identifying relevant traits in stance data 440-441.

Once the scoring is generated for the source, operation 414 summarizes the stance of data source 405 to be provided to a user as summary 460. This summary may include graphs, images, text, or any other similar information to provide a stance summary for data source 405. In some implementations, data objects 420-430 may comprise data objects related to a single event, however, data objects 420-430 may correspond to multiple events. As an example, operation 414 may generate summary that indicates a change in stance over time for a particular data source. When the stance information is identified within each of the data objects, the stance information may be associated with a time stamp of when that information was generated. As a result, the stance information may be used to indicate how the stance of a particular source changed over time based on the content of the data objects and the timestamps associated with the data objects.

FIG. 5 illustrates a data structure 500 for maintaining stance information for data objects according to an implementation. Data structure 500 includes columns for data sources 510 and stance types 512-514. Stance types 512-514 may represent various political affiliations, economic affiliations, or some other similar stance.

As described herein, data sources generate data objects that are identified by a summary service. As the objects are identified, the summary service may associate the data objects with various events, wherein the events may comprise dates of interest (e.g. product release dates), persons of interest, locations of interest, or some other similar type of event. Once the data objects are associated with the event, the summary service may generate summaries based at least in part on the stance of a data source. In determining the stance of a data source, the summary service may identify data pertinent to the particular stance of interest, wherein the pertinent data may comprise phrase or word choice, the organization of data within each of the data objects, the author of the data object, or some other similar data for the data object.

Here, based on the identified pertinent data, scores are generated that indicate the stance of each data source 520-523. These scores may be based on quantity of data identified for the particular stance type, the type of data that was identified for the particular stance type, or some other similar information. For example, first stance type 512 may represent a positive economic forecast, second stance type 513 may represent a neutral economic forecast, and third stance type 514 may represent a negative economic forecast. As a result, from the identified data, scores may be generated to provide a stance summary for the particular data source.

Using the example of data structure 500, data source 520 is allocated a first percentage (25%) for first stance type 512, a second percentage (50%) for second stance type 513, and a third percentage (25%) for third stance type 514. Once the scores are identified, a summary may be generated based on the scores. This summary may include stance information for a particular data source, such as indicating the data source 520 is mostly affiliated with second stance type 513, or may summarize stance information for multiple data sources, such as indicating an overall stance of all of the data sources.

Figure 6:
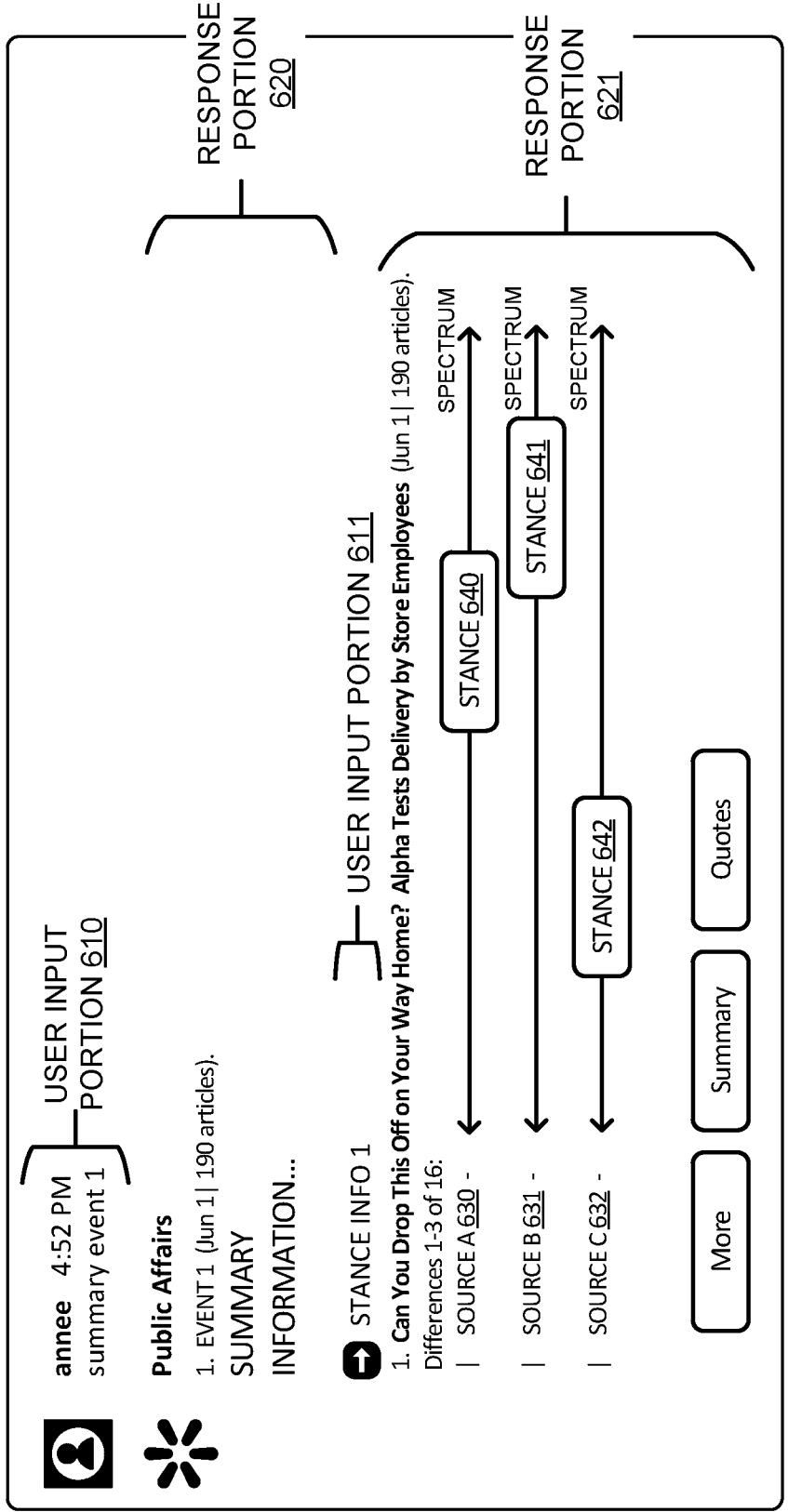
FIG. 6 illustrates a user interface to provide enhanced stance detection information according to an implementation.

In some implementations, data structure 500 may be used to summarize stance information for a single event, however, it should be understood that data structure 500 may be used to summarize stance information for multiple events. Additionally, while demonstrated as using percentages to score the stance for each of the data sources, it should be understood that the summary service may use various metrics and values (e.g. numerical, letter based, and the like) to score each of the data sources. These scores may be generated using one or more algorithms that can use the factors FIG. 6 illustrates a user interface 600 to provide enhanced stance detection information according to an implementation. User interface 600 includes user input portions 610-611 and response portions 620-621.

As depicted, a summary service may provide a user with the ability to query information about events and data sources to obtain summary information about events and/or the data sources. In the particular example of user interface 600, a user provides input via first user input portion 610 indicating a request for a summary of event 1. This first summary provided by the summary service at response portion 620 may include a text-based summary, an image-based summary, or some other similar type of summary, including combinations thereof. For example, the summary service may provide a paragraph summary of the event derived from data objects associated with the event. This summary may be based on the content of the data objects, the quantity of times data points within the data objects appear within the associated data objects, or some other similar information from the data objects.

Once response portion 620 is provided to the user of the summary service, the summary service may permit a user to provide user input portion 611, which corresponds to supplemental information about the particular event. In particular, the user at user input portion 611 provides input indicating a request for stance information related to a particular event. In response to the request, the summary service may identify data objects related to the event, process each of the data objects to identify pertinent data related to a stance for the event and determine a stance for one or more data sources based on the pertinent information.

Here, when the stance information is identified for each of the sources 630-632, the summary service develops stances 640-642 that correspond to a spectrum for each of the sources. This spectrum may be political, economic, or some other similar stance, including combinations thereof. For example, the stances 640-642 may correspond to a positivity/negativity rating for each of sources 630-632 and the relevant event. Based on the pertinent information identified by the summary service, the summary service may adjust or score the sources to determine the positivity/negativity rating of the source. This rating may be based on terms and phrases within the data objects, the order of information within the data objects, or some other similar information corresponding to the data objects.

Referring to the example of FIG. 6, source A 630 is associated with a stance that is depicted on a spectrum, wherein the spectrum indicates the stance in relation to various stance types. For example, the spectrum in FIG. 6 may correspond to political ideologies, and stance 640 may be generated on the spectrum based on the information within the data objects that correspond to source A 630 and the particular event. Although the example in user interface 600 depicts a two-dimensional spectrum demonstrating stances in relation to two stance types (e.g. conservative and liberal), it should be understood that a stance may be depicted in multiple dimensions, wherein stance types are greater than two.

Additionally, while demonstrated in the example of user interface as depicting the stances of data sources for a particular event, it should be understood that stance summaries may indicate a stance for one or more sources across multiple events. For example, a summary service may generate a summary of source 630 that indicates changes in stance over time. Thus, if source A 630 were providing data objects with conservative tendencies at a first time, but changed to providing data objects with liberal tendencies at a second time, the summary service may generate a graph, a text-based summary, or some other similar summary to demonstrate the changes in stance for source A 630 over a period of time.

Although demonstrated in the example of FIG. 6 as providing an interface for a user to request and receive summaries via text input, it should be understood that the summaries may be provided in any manner to a user of a summary service. In particular, the summary service may generate summaries when an event is identified, when particular type of event is identified, or at some other similar instance. Further, when the summary is generated the summary may, instead of placing stances on a spectrum, generate a graph, a text-based summary, an image, or some other summary, including combinations thereof. The text-based summary man include text from the data objects themselves and may further include text generated via natural language generation algorithms capable of including stance information derived from the relevant data objects.

Figure 7:
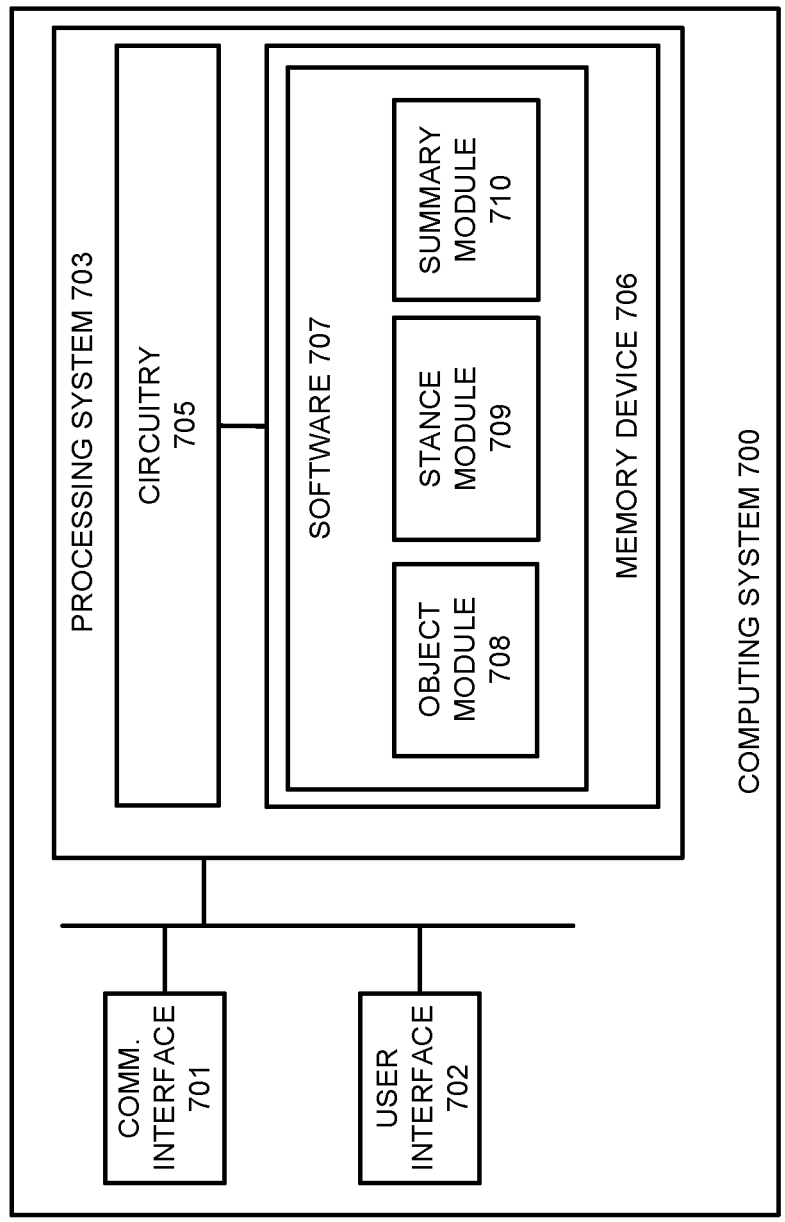
FIG. 7 illustrates a computing system to provide stance detection for events and data sources according to an implementation.

FIG. 7 illustrates a computing system 700 for providing multi-source event summarization according to an implementation. Computing system 700 is representative of any computing system or systems with which the various operational architectures, processes, scenarios, and sequences disclosed herein for an event summary service may be implemented. Computing system 700 is an example of summary service 110 and 310, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In some implementations, communication interface 701 may be configured to communicate with data resources to obtain data objects that correspond to various events. Communication interface 701 may further be configured to communicate with client or console devices of end users, wherein the users may request and receive summaries from computing system 700.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples. In some implementations, user interface 702 may be used in obtaining user summary requests and providing the summary to the requesting user.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device, but may also be implemented across multiple storage devices or sub-systems. Memory device 706 may comprise additional elements, such as a controller to read operating software 707. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes object module 708, stance module 709, and summary module 710, although any number of software modules may provide the same operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, object module 708 directs processing system 703 to identify data objects that correspond to an event, wherein the data objects may comprise articles, images, social media posts, or some other similar data object. Once the data objects are identified, object module 708 determines a data source for each of the data objects, wherein the data source may comprise a media outlet, a university, a corporate entity, or some other similar source. The source may be identified from a uniform resource locator (URL) associated with the source, from the author associated with the source, from metadata associated with the source, or from any other similar attribute capable of identifying the source of a data object.

Once the relevant data objects are identified, stance module 709 directs processing system 703 to identify pertinent stance information from each of the data objects. This stance information may comprise words or phrases from the texts related to a stance for source, an author of the data object, sources used for information of the data object, or some other similar information capable of extraction from each of the data objects. Once the pertinent stance information is identified from the data objects, stance module 709 determines a stance for each of the data sources in relation to the event. In at least one implementation, when determining the stance for a particular data source, computing system 700 may generate one or more scores based on the information extracted. For example, scores may be generated to determine how much of the data source is associated with a particular stance type. Thus, if the relevant stance were related to political opinion, a score may be generated to indicate the relation of the data objects with liberal idealism and a score may be generated to indicate the relation of the data objects with conservative idealism. Once the scores are generated, stance module 709 may generate an overall stance for each of the data sources based at least on the identified scores. Using the example above, if a greater score is attributed to conservative idealism After the stance is determined for the sources, summary module 710 may generate a summary based at least in part on the stance of the data sources. The summary may comprise one or more images, graphs, text-based summaries, or some other similar summary of the stance of the data sources. As an example, summary module 710 may generate a graphical interface summary that indicates the stance of at least one of the data sources in relation to other data sources. This graphical interface may depict a graph, slider, or some other similar image for the end user.

Although described in the previous example as providing summaries for a single event, it should be understood that summaries may be generated across multiple events. As an example, object module 708 may identify data objects that correspond to a particular data source. Once the objects are identified, pertinent data may be extracted from the data sources and used in determining a stance for the particular data source. Once the stance is identified, a summary may be generated based on the stance, wherein the summary may be provided to a user of computing system 700. In some implementations, the summary of the stance may indicate an overall stance of the data source, however, it should be understood that the summary of the stance may indicate how the stance of a data source has changed over a period of time. For example, computing system 700 may generate a graph, an image, or some other similar summary capable of summarizing the changes in stance of the particular data source.

In at least some implementations, summaries may be generated at the request of a user of computing system 700. This request may be generated locally via user interface 702 or may be generated from a console computing system (e.g. a smartphone, personal computer or tablet). In some examples, the user may identify the stance type of interest for the summary. For example, computing system 700 may generate summaries for various stance types including political stance types, economical stance types, or some other similar stance type. Accordingly, the user may select (via text, a button, or some other interface) the stance type of interest for the summary. Once the stance type is selected, information related to the stance type may be identified from the data objects, and the information may be used to generate the appropriate summary. For example, if the user selected a political stance summary, then a summary may be generated to indicate the stance of one or more data sources.

Returning to the elements of FIG. 1, data sources 122 may comprise websites and/or databases capable of providing news stories, social media posts, blog posts, images, and other similar types of objects to summary service 110. Data sources 122 may each comprise one or more communication interfaces and network interfaces, processing systems, computer systems, microprocessors, storage systems, storage media, or some other processing devices or software systems. Data sources 122 may each comprise one or more serving computing systems, desktop computing systems, or some other similar computing system.

Summary service 110 comprise communication interfaces and network interfaces, processing systems, computer systems, microprocessors, storage systems, storage media, or some other processing devices or software systems, and can be distributed among multiple devices. Summary service 110 may include software such as an operating system, logs, databases, utilities, drivers, networking software, and other software stored on a computer-readable medium.

Communication between the summary service 110 and sources 122 may use metal, glass, optical, air, space, or some other material as the transport media. Communication between the summary service 110 and sources 122 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between the summary service 110 and sources 122 may be a direct link or can include intermediate networks, systems, or devices, and can include a logical network link transported over multiple physical links.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of providing stance detection summaries for events, the method comprising:
    identifying, in a stance detection computing system, data objects related to an event from a plurality of data sources based on content in the data objects, wherein the plurality of data sources comprises a plurality of websites, and wherein two or more of the data objects are received from a data source of the plurality of data sources;
    identifying a data source from the plurality of data sources for each of the data objects;
    for each data object of the data objects, processing the data object to identify pertinent data related to a stance of a plurality of stances for the data source associated with the data object in relation to the event, wherein the pertinent data the data object comprises at least a phrase, a word, or an organization of data in the data object indicative of the stance for the data source;
    determining the stance from the plurality of stances for each of the plurality of data sources based on the pertinent data identified in a subset of the data objects from the data source, wherein the stance comprises a score;

generating, for display, a summary based on the stances of the plurality of sources, wherein the summary indicates at least the score associated with each of the plurality of data sources in relation to the event, and wherein the summary displays each of the scores relative to one another for the plurality of data sources;

processing one or more additional data objects that correspond to secondary events to identify additional pertinent data related to a stance for a first data source of the plurality of data sources;

identifying variations in stance over time for the first data source based on the pertinent data identified in the data objects and the additional pertinent data identified in the one or more additional data objects; and generating, for display, a second summary based on the variations in stance over time.

2. The method of claim 1 further comprising receiving a user request for the summary.

3. The method of claim 1, wherein generating the summary based on the stances of the plurality of sources comprises generating a visualization indicating differences in stance between at least a portion of the plurality of sources.

4. The method of claim 1 further comprising:
identifying a second stance for the first data source based on the pertinent data identified in the data objects and the additional pertinent data identified in the one or more additional data objects; and
generating, for display, a third summary based on the second stance.

5. The method of claim 1 further comprising receiving a user request for the summary, wherein the user request indicates a stance type of interest from a plurality of stance types, wherein the stance type of interest comprises the plurality of stances available for the data sources.

6. The method of claim 1, wherein summary indicates a stance of at least one data source for the event on a spectrum.

7. An apparatus comprising:
one or more computer readable storage media;
a processing system operatively coupled to the one or computer readable storage media; and
program instructions stored on the one or more computer readable storage media to provide stance detection for events that, when read and executed by the processing system, direct the processing system to:
identify data objects related to an event from a plurality of data sources based on content in the data objects, wherein the plurality of data sources comprises a plurality of websites, and wherein two or more of the data objects are received from a data source of the plurality of data sources;
identify a data source from the plurality of data sources for each of the data objects;
for each data object of the data objects, process the data object to identify pertinent data related to a stance of a plurality of stances for the data source associated with the data object in relation to the event, wherein the pertinent data the data object comprises at least a phrase, a word, or an organization of data in the data object indicative of the stance for the data source;
determine the stance from the plurality of stances for each of the plurality of data sources based on the pertinent data identified in a subset of the data objects from the data source, wherein the stance comprises a score;
generate, for display, a summary based on the stances of the plurality of sources, wherein the summary indicates at least the score associated with each of the plurality of data sources in relation to the event, and wherein the summary displays each of the scores relative to one another for the plurality of data sources;
process one or more additional data objects that correspond to secondary events to identify additional pertinent data related to a stance for a first data source of the plurality of data sources;
identify variations in stance over time for the first data source based on the pertinent data identified in the data objects and the additional pertinent data identified in the one or more additional data objects; and
generate, for display, a second summary based on the variations in stance over time.

8. The apparatus of claim 7, wherein the program instructions further direct the processing system to receive a request for the summary.

9. The apparatus of claim 7, wherein generating the summary based on the stances of the plurality of data sources comprises generating a visualization indicating differences in stance between at least a portion of the plurality of data sources.

10. The apparatus of claim 7, wherein the program instructions further direct the processing system to at least:
identify a second stance for the first data source based on the pertinent data identified in the data objects and the additional pertinent data identified in the one or more additional data objects; and
generate, for display, a third summary based on the second stance.

11. The apparatus of claim 7, wherein the program instructions further direct the processing system to receive a request for stance information, wherein the request indicates a stance type of interest from a plurality of stance types, wherein the stance type of interest comprises the plurality of stances available for the data sources.

12. The apparatus of claim 7, wherein summary indicates a stance of at least one data source for the event on a spectrum.

* * * * *